US005498693A

United States Patent [19]
Marshall et al.

[11] Patent Number: 5,498,693
[45] Date of Patent: Mar. 12, 1996

[54] METHOD OF REDUCING THE RESIDUAL UNSATURATED MONOMER CONTENT OF AN AQUEOUS DISPERSION OF A SATURATED POLYMER

[75] Inventors: Richard A. Marshall, Akron; Dane K. Parker, Massillon; James W. Hershberger, Oxford, all of Ohio

[73] Assignee: The Goodyear Tire & Rubber Company, Akron, Ohio

[21] Appl. No.: 313,504

[22] Filed: Sep. 26, 1994

[51] Int. Cl.$^6$ ................ C08F 6/24; C08F 6/14; C08F 6/16
[52] U.S. Cl. ............ 528/483; 528/489; 528/500
[58] Field of Search ............... 528/483, 484, 528/489, 500

[56] References Cited

U.S. PATENT DOCUMENTS

| 3,697,495 | 10/1972 | Bristol ................ 528/483 |
| 4,017,355 | 4/1977 | Kiyota et al. . |
| 4,031,056 | 6/1977 | Patel et al. . |
| 4,032,497 | 6/1977 | Kidoh et al. ............ 528/483 |
| 4,130,456 | 12/1978 | Itoh et al. ............ 528/500 |
| 4,130,527 | 12/1978 | Miller et al. . |
| 4,197,399 | 4/1980 | Noel et al. ............ 528/500 |
| 4,220,754 | 9/1980 | Feldman ............ 528/483 |

FOREIGN PATENT DOCUMENTS

| 2091128 | 9/1993 | Canada . |
| 2524221 | 12/1976 | Germany ............ 528/484 |
| 9013578 | 11/1990 | WIPO ............ 528/483 |

OTHER PUBLICATIONS

"Desorption of Residual Monomer from PVC Resins in Fluidized Bed Drier", Journal of Applied Polymer Science, vol. 51, 1119–1127 (1994).

Primary Examiner—Paul R. Michl
Assistant Examiner—Olga Asinovsky
Attorney, Agent, or Firm—Bruce J. Hendricks; D. J. Hudak

[57] ABSTRACT

A method for reducing residual unsaturated monomer content of an aqueous dispersion of a saturated polymer. The method involves contacting the aqueous dispersion with ozone resulting in ozonolysis of unsaturated monomers. The method is simple, economical and can be used with existing production facilities.

16 Claims, No Drawings

METHOD OF REDUCING THE RESIDUAL UNSATURATED MONOMER CONTENT OF AN AQUEOUS DISPERSION OF A SATURATED POLYMER

FIELD OF THE INVENTION

This invention relates to a method of reducing the residual unsaturated monomer content of an aqueous dispersion of a saturated polymer. More specifically, the invention relates to a method of reducing the level of vinyl monomers from aqueous dispersions of saturated polymers by contacting the dispersions with ozone.

BACKGROUND OF THE INVENTION

Emulsion polymerization is currently used in the commercial production of various polymers and copolymers including polymers and copolymers of vinyl acetate, various acrylates and methacrylates, acrylonitrile and methacrylonitrile, styrene and other vinyl substituted aromatics, vinyl chloride, vinylidene chloride, and the like. Emulsion polymerization or copolymerization generally occurs in an aqueous medium via free radically initiated addition polymerization to yield an aqueous dispersion of polymer particles, referred to as a latex or suspension, which can be either used directly or compounded with other ingredients for use as a coating, adhesive, paint sealant, etc., or the polymer particles can be separated from the dispersion such as by coagulation, spray drying, precipitation, etc., to yield a dry, powdered, thermoplastic resin. Relatively high monomer conversions such as 90 percent or higher are generally achieved during commercial production of polymer dispersions. The amount of unreacted or residual monomer remaining in the latex at the conclusion of the polymerization process is often as high as about 2 weight percent. Steam stripping, nitrogen and air have been conventionally used to physically remove most of the residual unsaturated monomers from the dispersion in order to meet existing health and environmental regulations relating to the control of volatile organic compounds. For example, conventional steam stripping is practical for recovering most of the unreacted vinyl chloride monomer from a polyvinyl chloride latex for reuse, and for reducing the residual monomer content from about 2 weight percent by weight to about 0.1 weight percent based upon the total weight of the aqueous dispersion. Nitrogen stripping provides a practical method for recovering additional residual monomer and for further reducing the vinyl chloride content in the latex to about 2 weight percent to 0.07 weight percent. Further reductions in the level of residual monomer are not economically or commercially practical using conventional stripping processes. Accordingly, to meet impending stricter health and environmental regulations, it will be necessary to develop new techniques which can be used to achieve significant further reductions in the amount of residual monomer contained in latices without significantly adding to the production costs or adversely affecting the properties and utility of the latices.

Whereas there are incentives to reduce the levels of unsaturated monomer, one must achieve such reductions in the absence of detrimental results to the desired product, namely, the saturated polymer. For example, any reduction must not destabilize the dispersion of polymer or significantly offset the desired molecular weight of the polymer subsequent to the polymerization reaction.

Various methods of reducing the amount of unsaturated monomer in the dispersion below the levels which are economically feasible utilizing conventional stripping techniques have been proposed. Such methods include chemical absorption, condensation and adsorption, biofiltration and various incineration techniques. These proposed methods are generally commercially unacceptable on account of a combination of being uneconomical, inefficient, difficult to control, and unreliable.

SUMMARY OF THE INVENTION

The invention provides a simple, economical method for reducing residual, unreacted unsaturated monomers contained in an aqueous dispersion of a saturated polymer. The levels of unsaturated monomer post treatment are lower than was heretofore practical or possible using conventional techniques. The method of the invention can be used by itself, but is more preferably used as a final step in reduction of residual unsaturated monomer content, such as in conjunction with conventional steam and/or inert gas stripping. In this preferred mode, the majority of residual unsaturated monomer in the aqueous polymer dispersion is physically removed from the aqueous dispersion using steam and/or inert gas stripping to facilitate recovery and recycling of most of the residual monomer, thereby reducing the amount of ozone needed to chemically react with the unsaturated monomer. Accordingly, the method of the invention can be used with conventional manufacturing facilities which have been augmented to accomplish the ozonolysis reaction in accordance with the invention.

The method involves contacting an aqueous dispersion of a saturated polymer with ozone under conditions whereby the ozone reacts with the unsaturation of the monomer in the dispersion. The method can be used to achieve a significant reduction in the residual unsaturated monomer content, without causing any significant adverse effect on the stability, polymer particle size, or other important properties of the dispersion and polymer.

DESCRIPTION OF THE PREFERRED EMBODIMENTS

The method of the invention is generally suitable for reducing residual unsaturated monomer contained in an aqueous dispersion of a saturated polymer.

The invention can be practiced using generally any conventional apparatus suitable for contacting an aqueous dispersion of saturated polymer with a gas stream containing ozone in an amount sufficient to achieve the desired reduction of residual monomer by an ozonolysis reaction. The method can be carried out in a batch, semi-batch, or continuous mode using conventional stripping equipment such as wetted wall towers, packed towers or spray towers, or more preferably by bubbling (sparging) a gas containing ozone through a vessel containing the aqueous dispersion. Continuous stirred reactors wherein gas containing ozone is bubbled into the dispersion at the bottom of the reactors are also suitable. Presently preferred are reactor columns wherein the aqueous dispersion of saturated polymer continuously flows downwardly countercurrent to the ozone which is continuously bubbled upwardly from the bottom of the column.

The ozone used in the method of the invention may be generated by passing air or oxygen through a commercial ozone unit wherein ozone is produced by an electrical arc or spark generated in the presence of the air or oxygen. Suitable ozone units are well known to those skilled in the art. Commercially available ozone generators can typically generate up to about 2 percent ozone by weight in air and up to about 8 percent ozone by weight in oxygen.

Pressure and temperature conditions for the ozonolysis reaction may vary. The pressure in the reactor or apparatus wherein the dispersion is contacted with the gas containing the ozone is not believed to be a reaction rate controlling variable. Ozone is a strong oxidizing agent and reacts readily with the unsaturated monomers at moderate or even low temperatures. Accordingly, it is generally unnecessary to heat the contents of the reactor or apparatus wherein the ozonolysis is being carried out. Suitable temperatures for the ozonolysis reaction vessel can generally range from about ambient temperature, i.e., about 10° or 15° C., up to about 90° or 100° C., with temperatures in the range from about 25° C. to about 80° C. being preferred.

The time needed for the ozonolysis reaction may vary depending on the initial concentration of the unsaturated monomer, the chemical reactivity of the unsaturated monomer, desired level of reduction of the unsaturated monomer, concentration of ozone, and temperature. Generally speaking, the reaction time may range from as little as seconds to as long as hours.

The amount of ozone in the carrier gas is not critical to the extent that even small amounts of ozone will chemically react (ozonolysis reaction) with the unsaturated residual monomers in the dispersion. Accordingly, typical ozone concentrations in the carrier gas stream range from about 0.01 percent by weight to about 8 percent by weight based upon the total weight of the gas stream. Suitable carrier gases include air, oxygen, nitrogen, helium, argon, carbon dioxide and the like, as well as various mixtures thereof, although air and oxygen are highly preferred.

The amount of ozone which is used relative to the amount of unsaturated residual monomer may vary. Generally the mole ratio of ozone to unsaturated monomer will range from 100:1 to 1:100, and preferably from 10:1 to 1:1.

The unsaturated monomers that are reacted in accordance with the invention are vinyl compounds. Representative of the residual unsaturated monomers which may be reduced in accordance with the invention include vinyl chloride, vinyl acetate, vinylidene chloride, acrylates, methacrylates, acrylonitrile, methacrylonitrile, styrene, ethylene, α-methyl styrene and mixtures thereof. The preferred monomers are vinyl chloride, vinyl acetate and vinylidene chloride. These monomers are generally present in the aqueous polymer dispersion, prior to contacting with ozone, in an amount ranging from 2 weight percent to 0.07 weight percent of unsaturated monomer. After treatment with ozone, the level of residual monomer may range from 0.01 to 0.0001 weight percent of the unsaturated monomer based upon the total weight of the aqueous dispersion.

The invention is used to treat an aqueous dispersion of a saturated polymer. The particle size of the polymer may range from 30 to 300,000 nanometers in diameter. In those instances where the dispersion is a latex, the polymer particle size may range from 30 to 2,000 nanometers. In those instances where the dispersion is a suspension, the polymer particle size may range from 2,000 to 300,000 nanometers.

The method of the invention can generally be used for lowering the residual unsaturated monomer content of a variety of aqueous dispersions of saturated polymer. Since ozone rapidly reacts with any ethylenic unsaturation regardless of whether it is located in the monomer or in the polymer, use with unsaturated polymers is not recommended. Examples of suitable saturated polymers include polyvinyl chloride, polyvinyl acetate, polyvinylidene chloride, polyacrylates, polymethacrylates, polyacrylonitrile, polymethacrylonitrile, polystyrene, poly α-methylstyrene, polyethylene, polyethylene-vinyl acetate, copolymers of the above as well as mixtures thereof.

The present invention is further described in the following examples which are presented in order to further illustrate and not limit the scope of the present invention.

EXAMPLE 1

Control

A 500 ml capacity lab glass model no. LG-3761 gas washing bottle with a fritted gas inlet tube was charged with 400 ml of polyvinyl chloride latex containing 0.009 weight percent (90 ppm) of vinyl chloride monomer. The particle size of the polymer ranged from 200 to 1200 nanometers in diameter. Through the gas inlet tube, at room temperature, was introduced air at a flow rate of 0.027 liters per second. At various times, small aliquots of latex were removed for gas chromatographic analysis. Table I lists the various reaction times and the respective residual vinyl chloride monomer level in the latex evidencing the physical removal of monomer by the use of air.

TABLE I

| Time (min) | Control (PPM VCM) |
| --- | --- |
| 0 | 90 |
| 5 | 66 |
| 10 | 52 |
| 15 | 42 |
| 20 | 34 |
| 25 | 26 |
| 30 | 20 |

EXAMPLE 2

The gas washing bottle used in Example 1 was charged with 400 ml of polyvinyl latex containing 0.0084 weight percent (84 ppm) of vinyl chloride monomer. The particle size of the polymer ranged from 200 to 1200 nanometers in diameter. Through the gas inlet tube, at room temperature, was introduced an air/ozone gas containing 1.64 weight percent of ozone. The air/ozone gas was introduced at a flow rate of 0.027 liters per second. At various times, small aliquots of latex were removed for gas chromatographic analysis. Table II below lists the various reaction times and the respective residual vinyl chloride monomer level.

EXAMPLE 3

The procedure of Example 2 was repeated except the starting concentration of the residual vinyl chloride monomer was 0.0166 weight percent (166 ppm). Table II below lists the various reaction times and the respective residual vinyl chloride monomer level.

TABLE II

| Time (min) | Ex. 2 (PPM VCM) | Ex. 3 DR Latex (PPM VCM) |
| --- | --- | --- |
| 0 | 84 | 166 |

TABLE II-continued

| Time (min) | Ex. 2 (PPM VCM) | Ex. 3 DR Latex (PPM VCM) |
| --- | --- | --- |
| 5 | 36 | 78 |
| 10 | 17 | 48 |
| 15 | 5 | 22 |
| 20 | 4 | 12 |
| 25 | 2 | 9 |
| 30 | <1 | 3 |

EXAMPLE 4

A 500 ml capacity lab glass model No. LG-3761 gas washing bottle with a fritted gas inlet tube was charged with 400 ml of polyvinyl chloride latex containing 0.0294 weight percent (294 ppm) of vinyl chloride monomer. The particle size of the polymer ranged from 200 to 1200 nanometers in diameter. Through the gas inlet tube, at room temperature, was introduced an air/ozone gas containing 1.06 weight percent of ozone. The air/ozone gas was introduced at a flow rate of 0,043 liters per second. At various times, small aliquots of latex were removed for gas chromatographic analysis. Table III below lists the various reaction times and the respective residual vinyl chloride monomer level.

TABLE III

| Time (min) | Ex. 4 (PPM VCM) |
| --- | --- |
| 0 | 294 |
| 5 | 160 |
| 10 | 69 |
| 15 | 24 |
| 20 | 8 |
| 25 | 3 |
| 30 | <1 |

EXAMPLE 5

To the gas washing bottle used in Example 1 was charged with 400 ml of polyvinyl chloride suspension containing 0.0996 weight percent (996 ppm) of vinyl chloride monomer. The particle size of the polymer ranged from 20,000 to 50,000 nanometers. Through the gas inlet tube, at room temperature, was introduced an air/ozone gas containing 1.06 weight percent of ozone. The air/ozone gas was introduced at a flow rate of 0.043 liters per second. At various times, small aliquots of latex were removed for gas chromatographic analysis. Table IV below lists the various reaction times and the respective residual vinyl chloride monomer level.

TABLE IV

| Time | Ozone RVCM (PPM) |
| --- | --- |
| 0 | 995.8 |
| 5 | 885.9 |
| 10 | 811.3 |
| 15 | 787.0 |
| 20 | 787.9 |
| 25 | 720.0 |
| 30 | 674.9 |

Table V provides the molecular weight data from the saturated polymers isolated from the dispersions treated in Examples 2 and 5. The data shows successful reduction in the levels of unsaturated monomer without concomitant degradation of polymer.

TABLE V

Molecular Weight Data of Saturated Polymer

| | Example | | | | | |
| --- | --- | --- | --- | --- | --- | --- |
| | Example 2 | | | | Example 5 | |
| Time Ozonated, min | 0 | 15 | 20 | 30 | 0 | 30 |
| Molecular Weight[1] | | | | | | |
| Number Average × $10^3$ | 69.1 | 65.8 | 65.3 | 66.5 | 49.0 | 48.4 |
| Weight Average × $10^3$ | 148.2 | 146.4 | 144.9 | 141.4 | 95.8 | 95.2 |
| Intrinsic Viscosity[2] | 1.44 | 1.43 | 1.41 | 1.39 | 1.04 | 1.03 |

Notes:
[1]Gel Permeation Chromatography Results
[2]Calculated from GPC data

While in accordance with the patent statutes the best mode and preferred embodiment has been set forth, the scope of the invention is not limited thereto, but rather by the scope of the attached claims.

What is claimed is:

1. A method for reducing the residual unsaturated monomer content of an aqueous dispersion of a saturated polymer, comprising:

contacting the aqueous dispersion with a gas containing ozone, and reacting the residual unsaturated monomer with said ozone.

2. The method of claim 1, wherein said gas comprises air, helium, oxygen, argon, carbon dioxide, nitrogen, or mixtures thereof.

3. The method of claim 2, wherein said gas contains from about 0.01 percent by weight to about 8 percent by weight of ozone based upon the total weight of the gas.

4. The method of claim 3, wherein the mole ratio of said ozone to the residual unsaturated monomer ranges from about 100:1 to 1:100.

5. The method of claim 1, wherein said unsaturated monomer is a vinyl compound.

6. The method of claim 5, wherein said vinyl compound is vinyl chloride, vinyl acetate, vinylidene chloride, acrylate, methacrylate, acrylonitrile, methacrylonitrile, styrene, α-methylstyrene, ethylene, or mixtures thereof.

7. The method of claim 1, wherein said dispersion of a saturated polymer prior to contacting with ozone contains from 2 weight percent to 0.07 weight percent of unsaturated monomer.

8. The method of claim 1, wherein said dispersion of a saturated polymer after reacting with said ozone contains from about 0.01 weight percent to about 0.0001 weight percent of unsaturated monomer.

9. The method of claim 1, wherein said saturated polymer is polyvinyl chloride, polyvinyl acetate, polyvinylidene chloride, polyacrylate, polymethacrylate, polyacrylonitrile, polymethacrylonitrile, polystyrene, poly α-methylstyrene, polyethylene, or copolymers of the above, or mixtures thereof.

10. The method of claim 1, wherein said dispersion is a latex.

11. The method of claim 1, wherein said dispersion is a suspension.

12. The method of claim 1, wherein the particle size of said polymer ranges from 30 to 300,000 nanometers.

13. The method of claim 10, wherein the particle size of said polymer ranges from 30 to 2,000 nanometers.

14. The method of claim 11, wherein the particle size of said polymer ranges from 2,000 to 300,000 nanometers.

15. The method of claim 1, wherein aqueous dispersions of saturated polymer is contacted with a countercurrent flow of ozone containing gas.

16. The method of claim 1, wherein said gas is air, helium, oxygen, argon, carbon dioxide, or nitrogen, or mixtures thereof, wherein the amount of said ozone is from about 0.01 percent by weight to about 8 percent by weight based upon the total weight of said gas, wherein the unsaturated monomer is vinyl chloride, vinyl acetate, vinylidene chloride, acrylate, methacrylate, acrylonitrile, methacrylonitrile, styrene, α-methylstyrene, ethylene, or mixtures thereof, wherein said dispersion of a saturated polymer after reacting with said ozone contains from about 0.01 weight percent to about 0.0001 weight percent of unsaturated monomer, and wherein the particle size of said polymer is from about 30 to about 300,000 nanometers.

* * * * *